US012592410B1

(12) United States Patent
Solnit et al.

(10) Patent No.: US 12,592,410 B1
(45) Date of Patent: Mar. 31, 2026

(54) COMPRESSION APPARATUS FOR ELECTROCHEMICAL STACKS

(71) Applicant: ELECTRIC HYDROGEN CO., Devens, MA (US)

(72) Inventors: Asher Solnit, Atlanta, GA (US); Leland Kirshen, Cambridge, MA (US); Christian Fay, South Boston, MA (US)

(73) Assignee: ELECTRIC HYDROGEN CO., Devens, MA (US)

( * ) Notice: Subject to any disclaimer, the term of this patent is extended or adjusted under 35 U.S.C. 154(b) by 0 days.

(21) Appl. No.: 19/087,906

(22) Filed: Mar. 24, 2025

(51) Int. Cl.
*H01M 10/04* (2006.01)
*H01M 50/204* (2021.01)
*H01M 50/242* (2021.01)
*H01M 50/262* (2021.01)

(52) U.S. Cl.
CPC ..... *H01M 10/0481* (2013.01); *H01M 50/204* (2021.01); *H01M 50/242* (2021.01); *H01M 50/262* (2021.01)

(58) Field of Classification Search
CPC .......... H01M 10/0481; H01M 50/204; H01M 50/242; H01M 50/262
See application file for complete search history.

(56) References Cited

U.S. PATENT DOCUMENTS

2024/0097263 A1 *    3/2024    Kim .................... H01M 50/291

FOREIGN PATENT DOCUMENTS

| CN | 108336272 A * | 7/2018 | ............ H01M 50/20 |
| DE | 102010012930 A1 * | 9/2011 | .......... H01M 50/209 |
| WO | WO-2021001613 A1 * | 1/2021 | .......... H01M 50/264 |

* cited by examiner

*Primary Examiner* — Jonathan G Jelsma
(74) *Attorney, Agent, or Firm* — Lempia Summerfield Katz LLC

(57) ABSTRACT

The following disclosure relates to a compression apparatus for an electrochemical stack having a first plate, a second plate, and a plurality of electrochemical cells positioned between the first plate and the second plate. The compression apparatus includes a spring compression bar, a plurality of first fasteners, a plurality of second fasteners, and a plurality of springs positioned around a circumference of each second fastener.

20 Claims, 8 Drawing Sheets

COMPRESSION APPARATUS FOR ELECTROCHEMICAL STACKS

FIELD

The following disclosure relates to electrochemical devices, systems, and components thereof. More specifically, the following disclosure relates to a compression apparatus for a stacked fluidic device such as an electrochemical cell stack or fuel cell stack.

BACKGROUND

Hydrogen has been considered as an ideal energy carrier to store renewable energy. Proton exchange membrane water electrolysis (PEMWE) as a means for hydrogen production offers high product purity, fast load response times, small footprints, high efficiencies, and low maintenance efforts. It is regarded as a promising technology, especially when coupled with renewable energy sources.

An electrolysis cell or system uses electrical energy to drive a chemical reaction. For example, water is split to form hydrogen and oxygen. The products may be used as energy sources for later use. In recent years, improvements in operational efficiency have made electrochemical systems competitive market solutions for energy storage, generation, and/or transport. For example, the cost of generation may be below $6 per kilogram of hydrogen in some cases. Increases in efficiency and/or improvements in operation will continue to drive the installation of electrochemical systems.

SUMMARY

In one embodiment, a compression apparatus is provided for an electrochemical stack having a first plate, a second plate, and a plurality of electrochemical cells positioned between the first plate and the second plate. The compression apparatus includes a spring compression bar positioned between the first plate and the second plate of the electrochemical stack. The compression apparatus further includes a plurality of first fasteners, wherein each first fastener is configured to be positioned through a respective opening of the first plate and a respective opening of the spring compression bar, and wherein each first fastener is secured at one end adjacent to the first plate and at a second end adjacent to the spring compression bar. The compression apparatus further includes a plurality of second fasteners, wherein each second fastener is configured to be positioned through a respective opening of the spring compression bar and a respective opening of the second plate, wherein each second fastener is secured at one end adjacent to the first plate and at a second end adjacent to the second plate. The compression apparatus further includes a plurality of springs positioned around a circumference of each second fastener between the first plate and the spring compression bar of the respective second fastener.

In another embodiment, an electrochemical stack is provided. The electrochemical stack includes a first plate, a second plate, a plurality of electrochemical cells positioned between the first plate and the second plate, a first compression apparatus positioned on a first side of the plurality of electrochemical cells, and a second compression apparatus positioned on a second side of the plurality of electrochemical cells opposite from the first side. Each compression apparatus of the first compression apparatus and the second compression apparatus further include a spring compression bar positioned between the first plate and the second plate of the electrochemical stack. Each compression apparatus further includes a plurality of first fasteners, wherein each first fastener is configured to be positioned through a respective opening of the first plate and a respective opening of the spring compression bar, and wherein each first fastener is secured at one end adjacent to the first plate and at a second end adjacent to the spring compression bar. Each compression apparatus further includes a plurality of second fasteners, wherein each second fastener is configured to be positioned through a respective opening of the spring compression bar and a respective opening of the second plate, wherein each second fastener is secured at one end adjacent to the first plate and at a second end adjacent to the second plate. Each compression apparatus further includes a plurality of springs positioned around a circumference of each second fastener between the first plate and the spring compression bar of the respective second fastener.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are described herein with reference to the following drawings.

FIG. 3 depicts an example of a compression apparatus.

FIG. 4 depicts a cross-sectional view of the compression apparatus shown in FIG. 3.

FIG. 5 depicts an example of an electrochemical stack with a first compression apparatus and a second compression apparatus.

Figure 1:
FIG. 1 depicts an example of an electrochemical or electrolytic cell.
Figure 1:
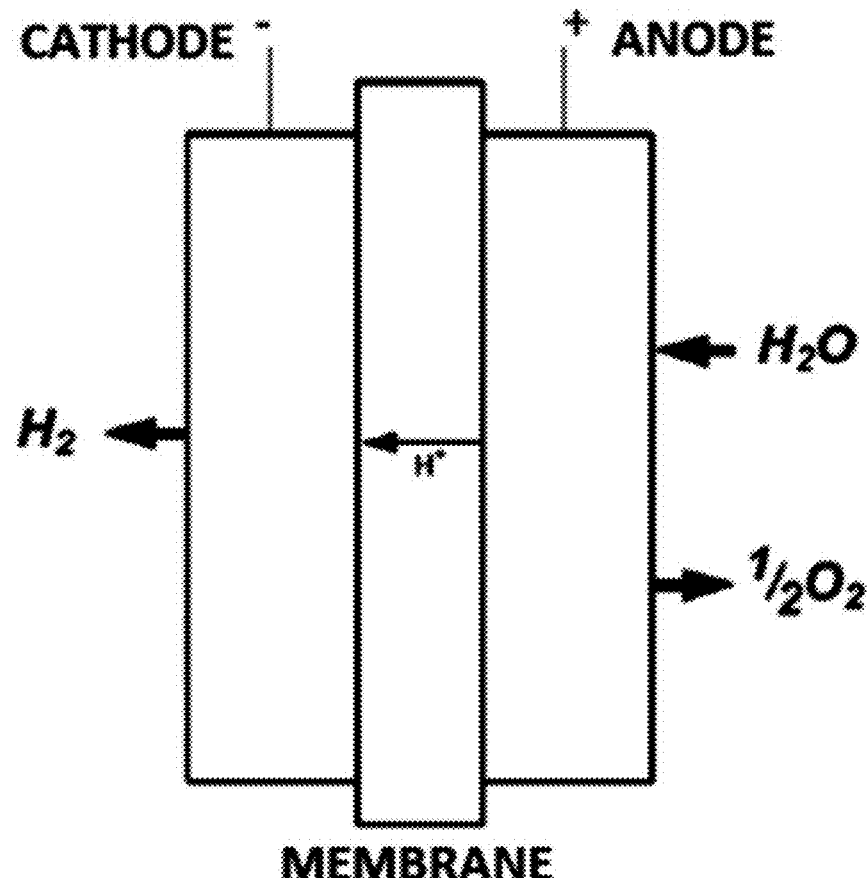

While the disclosed compositions and methods are representative of embodiments in various forms, specific embodiments are illustrated in the drawings (and are hereafter described), with the understanding that the disclosure is intended to be illustrative and is not intended to limit the claim scope to the specific embodiments described and illustrated herein.

DETAILED DESCRIPTION

Electrochemical cell stacks or systems may refer to fuel cells, electrolysis cells, or any other stacked fluidic cell device or system. While the following description primarily relates to electrolysis cell stacks and systems, the improved mechanisms, devices, systems, and methods disclosed herein may also be applicable to other stacked fluidic cell devices and systems (such as fuel cells). In other words, the improvements disclosed herein, while discussed with relation to an electrolysis cell stack or system may also be applicable to a fuel cell stack or system and should not be construed as limited to one or the other.

An electrolyzer or electrolysis system may include one or more electrolyzer stacks, wherein each stack is made up of a plurality of individual electrolytic cells. The discussed architectures and techniques may support the management of the compression of electrolyzer stacks. Each stack may be independently connected to power electronics, water, and gas systems. In some cases, a subgroup of electrolyzer stacks may be coupled together through one or more mechanisms. In some cases, each stack and/or sub-group may be compressed independently using a separate support structure. In other cases, each stack and/or sub-group may be compressed in unison using the same support structure.

The compression of an electrolyzer stack may be actively and/or passively managed during the operation and life cycle of an electrolyzer system in order to maintain optimal membrane electrode assembly (MEA), electrical contact resistance, and/or seal compression. In some cases, the compression of an electrolyzer stack is varied during the operation and the lifetime of the (or each) stack to maintain MEA compression, minimize electrical contact resistance, and/or extend seal life. In addition, because stacks may operate through a range of temperatures and incorporate thermally mismatched materials, provisions are needed for substantial thermal expansion mismatch between a structure providing compression and the electrolyzer stack.

The apparatuses, systems, and methods described herein provide for an improved passive compression management of an electrochemical stack. Specifically, an apparatus is provided that includes a plurality of springs positioned alongside the length of the electrochemical stack. This arrangement advantageously provides passive compression control of the electrochemical stack during operation of the stack while minimizing or eliminating any increase in stack height. In other words, by positioning the compression apparatus along the length of the electrochemical stack, unutilized space of the system may be used, while avoiding adding additional height to the electrochemical stack that would exist if an array or bed of springs were positioned on at least one end of the stack between the outer plates of the stack.

Such a solution having such a compression apparatus positioned on at least one edge of the electrochemical stack system that allows for improved passive compression management over conventional operating cells/stacks.

Various apparatuses and systems are provided herein that describe such an improved passive compression mechanism having one or more plurality of springs positioned around one or more fasteners extending between outer plates of the electrochemical stacks.

Electrochemical Cells and Stacks

FIG. 1 depicts an example of an electrochemical cell 100 for the production of hydrogen gas and oxygen gas through the splitting of water. The electrochemical cell includes a cathode, an anode, and a membrane positioned between the cathode and anode. Within the water-splitting electrolysis reaction, one interface runs an oxygen evolution reaction (OER) while the other interface runs a hydrogen evolution reaction (HER). For example, the anode reaction is $H_2O \rightarrow 2H^+ + \frac{1}{2}O_2 + 2e$ and the cathode reaction is $2H^+ + 2e \rightarrow H_2$. The water electrolysis reaction has recently assumed great importance and renewed attention as a potential foundation for a decarbonized "hydrogen economy."

Figure 2:
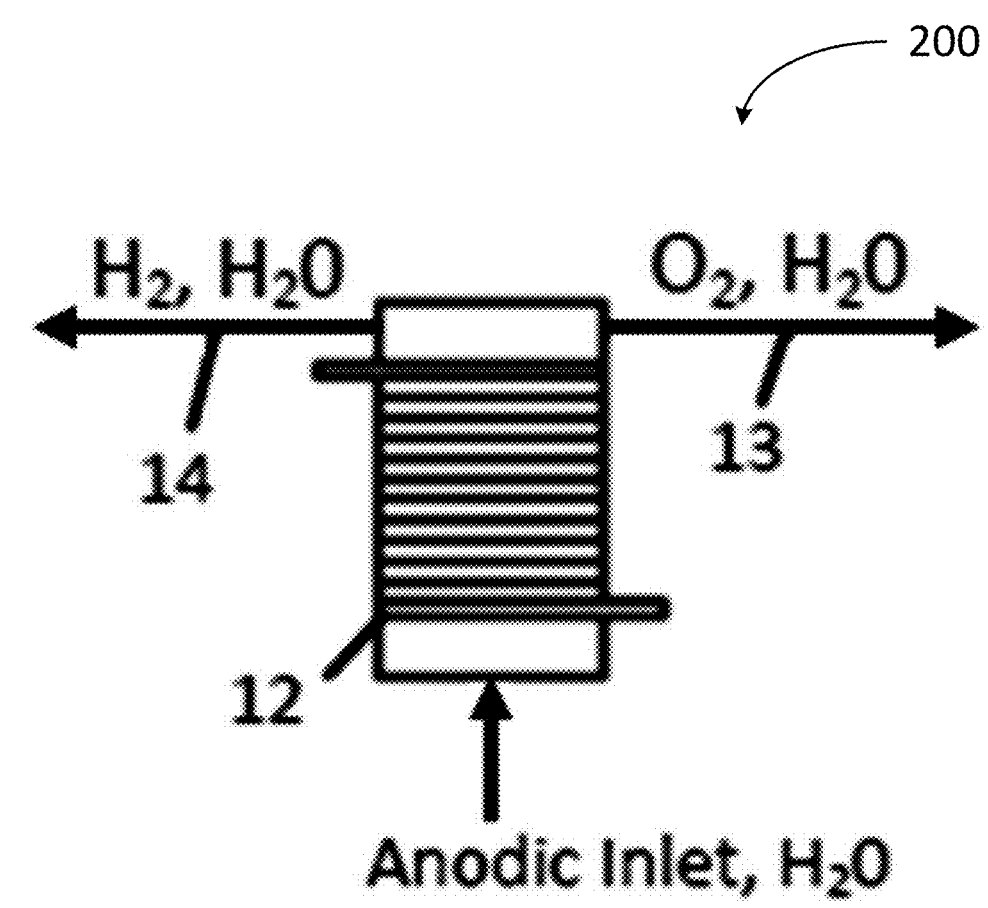
FIG. 2 depicts an example of a system including an electrochemical stack having a plurality of electrochemical cells of FIG. 1.

FIG. 2 depicts an example of an electrochemical system 200 including at least one electrolyzer or electrochemical stack 12, wherein each electrochemical stack 12 includes a plurality of electrochemical cells of FIG. 1. In certain examples, the electrolyzer or electrochemical stack 12 may contain 50-1000 cells, 50-100 cells, 500-700 cells, or more than 1000 cells. Any number of cells may make up a stack. The electrochemical cells within the electrochemical stack 12 may be configured to operate with 200 mV or less of pure resistive loss when operating at a high current density (e.g., at least 3 Amps/cm$^2$, at least 4 Amps/cm$^2$, at least 5 Amps/cm$^2$, at least 6 Amps/cm$^2$, at least 7 Amps/cm$^2$, at least 8 Amps/cm$^2$, at least 9 Amps/cm$^2$, at least 10 Amps/cm$^2$, at least 11 Amps/cm$^2$, at least 12 Amps/cm$^2$, at least 13 Amps/cm$^2$, at least 14 Amps/cm$^2$, at least 15 Amps/cm$^2$, at least 16 Amps/cm$^2$, at least 17 Amps/cm$^2$, at least 18 Amps/cm$^2$, at least 19 Amps/cm$^2$, at least 20 Amps/cm$^2$, at least 25 Amps/cm$^2$, at least 30 Amps/cm$^2$, in a range of 1-30 Amps/cm$^2$, in a range of 3-20 Amps/cm$^2$, in a range of 3-15 Amps/cm$^2$, in a range of 3-10 Amps/cm$^2$, or in a range of 10-20 Amps/cm$^2$).

Furthermore, the electrochemical cells within each electrochemical stack 12 may be configured to operate at a variable hydrogen production mode or constant hydrogen production mode and at a high cell current density (e.g., see examples above) when operating at a defined pressure on the cathode side of the cell/stack that is greater than or equal to atmospheric pressure (e.g., at least 1.1 atm, at least 2 atm, at least 3 atm, at least 4 atm, at least 5 atm, at least 6 atm, at least 7 atm, at least 8 atm, at least 9 atm, at least 10 atm, at least 11 atm, at least 12 atm, at least 13 atm, at least 14 atm, at least 15 atm, at least 16 atm, at least 17 atm, at least 18 atm, at least 19 atm, at least 20 atm, at least 25 atm, at least 30 atm, at least 35 atm, at least 40 atm, in a range of 1-40 atm, in a range of 3-20 atm, in a range of 3-15 atm, in a range of 3-10 atm, or in range of 10-20 atm).

In certain examples, the electrochemical system may include a plurality of electrochemical stacks. In one particular example, the system includes at least two electrochemical stacks that may be connected to a same power source and may be configured to operate in a range of 1000 mv to 3000 mv when operating at a high cell current density (e.g., see examples above).

As illustrated in the system of FIG. 2, water (H$_2$O) may be supplied to the anodic inlet of an electrolyzer or electrochemical stack 12. In some embodiments, only the anodic inlet of the electrochemical stack 12 may receive water. In these embodiments, the cathode side of the electrochemical stack 12 may not receive water (e.g., a dry cathode side may be used). In another embodiment, a cathode inlet may also receive water, wherein the water may be supplied to the cathode inlet to cool the electrochemical stack 12 during electrolysis.

The water supplied to the anodic inlet flows to an anodic inlet manifold that distributes the water to the anode side of the plurality of cells contained with the electrochemical stack 12. In embodiments where water is supplied to the cathode inlet, water supplied to the cathode inlet flows to a cathodic inlet manifold that distributes the water to the cathode side of the plurality of cells in the electrochemical stack 12. In certain examples, the amount of water (e.g., deionized (DI) water) transferred to or circulated through each cell of the electrochemical stack 12 may be in a range of 0.25-1 mL/Amp/cell/min, in a range of 0.25-5 mL/Amp/cell/min, or in a range of 0.5-1 mL/Amp/cell/min.

During electrolysis, oxygen (O$_2$) is produced at the anode side of the electrolytic cells and hydrogen (H$_2$) is produced at the cathode side of the electrolytic cells. Specifically, a water splitting electrolysis reaction is configured to take place within each individual cell in the cell stack 12. Each cell includes one interface (the anode side of the cell) configured to run an oxygen evolution reaction (OER) and another interface (the cathode side of the cell) configured to run a hydrogen evolution reaction (HER), such as depicted in FIG. 1.

In another embodiment, an arrangement is provided with multiple cell stacks in series/parallel.

In some cases, each cell in a stack may need to accommodate two or three different streams of water flowing past the cell (e.g., water flowing on the anode side, on the cathode side, and in some cases, within a coolant stream) as well as allowing electricity to be conducted through the cell. Electrolyzer systems operate under pressure (e.g., the water flows across the cells in the stack at high pressures), which means the water needs to be sealed within the stack. In one example, an electrolyzer stack may operate at 10 atm or higher. Seals surrounding the cells may need to have force applied to the sealing areas to work effectively (i.e., in order to form an appropriate seal). Further, because water pressure is applied to the cells throughout the stack, there is a tendency for the entire stack to want to separate under this pressure. Thus, in order to pre-compress the seals and to hold the entire stack together during operation, the stack and individual cells need to be compressed.

In some cases, a stack may be under variable pressure. In one example, when the stack is turned off, the pressure inside the stack may decrease, which means the stack may be subjected to various pressure cycles. By reducing seal compression when the electrolyzer stack is not operating, this reduces the number of overall compression sets and the seal lifetime is extended. Also, for the seal, upon pressurization, the seal compression can be reduced, and it will also seal less pressure.

Further, in some cases, the stack may need to accommodate for thermal expansion due to thermally mismatched material. When the cell stack is introduced to different temperatures, (e.g., ambient air temperatures or different operating conditions), the materials within the cell stack may expand or compress, causing a change in pressure. This will change both the MEA and seal compression, as a result the stack may not operate efficiently or become damaged.

Uncontrolled compression of electrolyzer stacks and cells may lead to a number of problems, including under and over-compression of the MEA, a reduction of seal lifetime, and/or under-compression or over-compression of the stack due to thermally mismatched materials.

For the cells in a stack, there may be an ideal membrane contact stress. When an MEA is under compressed, the contact resistance may be high, and the performance may be low. When the MEA is over-compressed, then the MEA can be damaged, and its lifetime can be shortened. Also, MEA over-compression may suppress mass transport (i.e., water to electrode, gas away from electrode). Thus, maintaining an optimal MEA compression, including the ideal membrane contact stress, during operation and throughout the lifetime of the cells and stack may be desirable.

The seal, when compressed, may degrade over time and over the many compression sets. Seals may also creep after many compression sets, meaning the seals lose their original shape and become compacted or flattened. Both seal degradation and creep lead to less sealing force (i.e., the seal being able to seal less pressure) and/or leaks. Thus, managing the compression of a stack during operation of the stack remains desirable.

Compression Apparatus

In certain embodiments, one or more compression apparatuses may be provided to assist in managing compression during operating of an electrochemical stack. In certain examples, the compression apparatus includes a plurality of springs on a fastener configured to be positioned alongside the length of the electrochemical stack.

Figure 3:
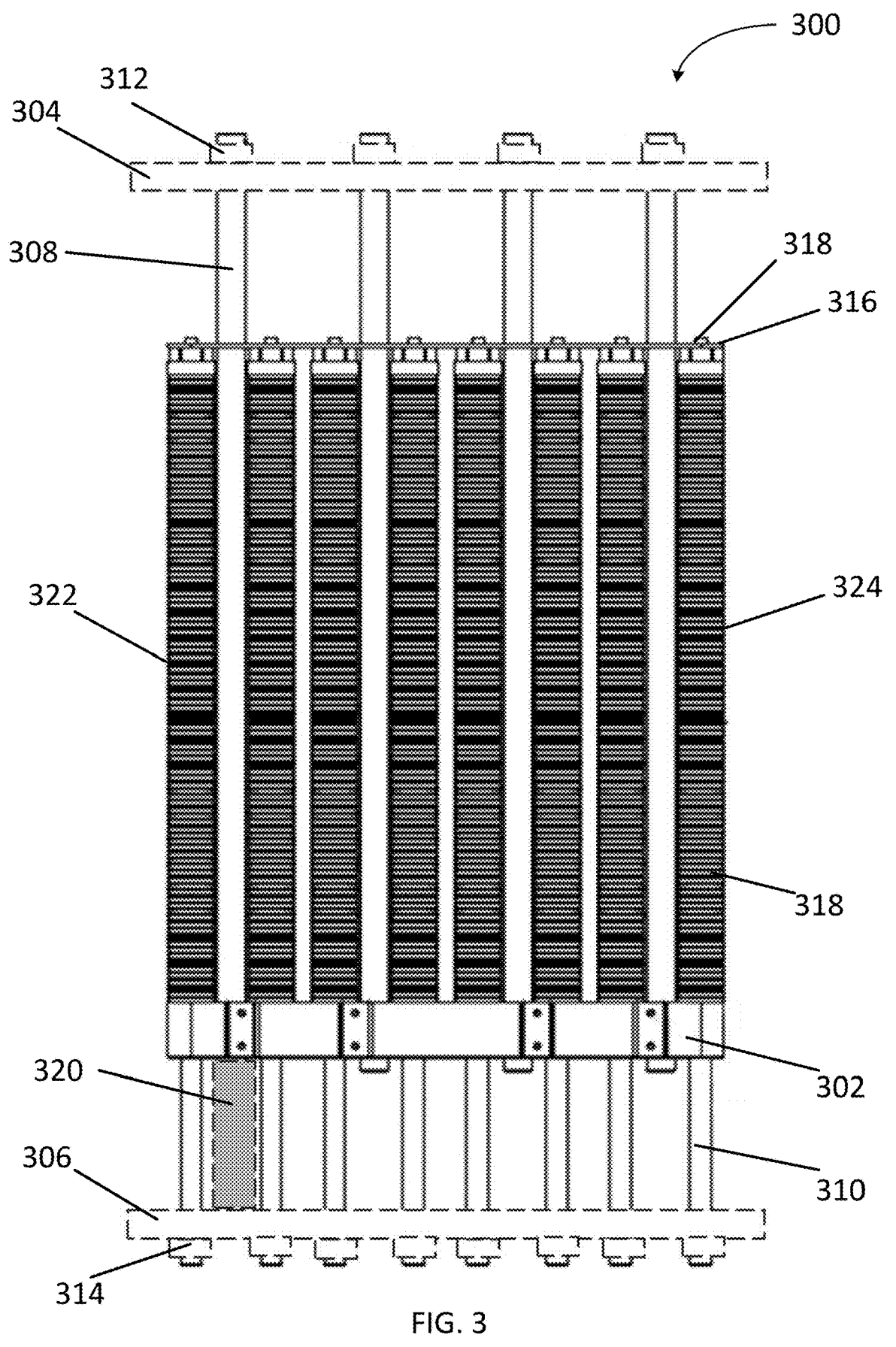
Figure 4:
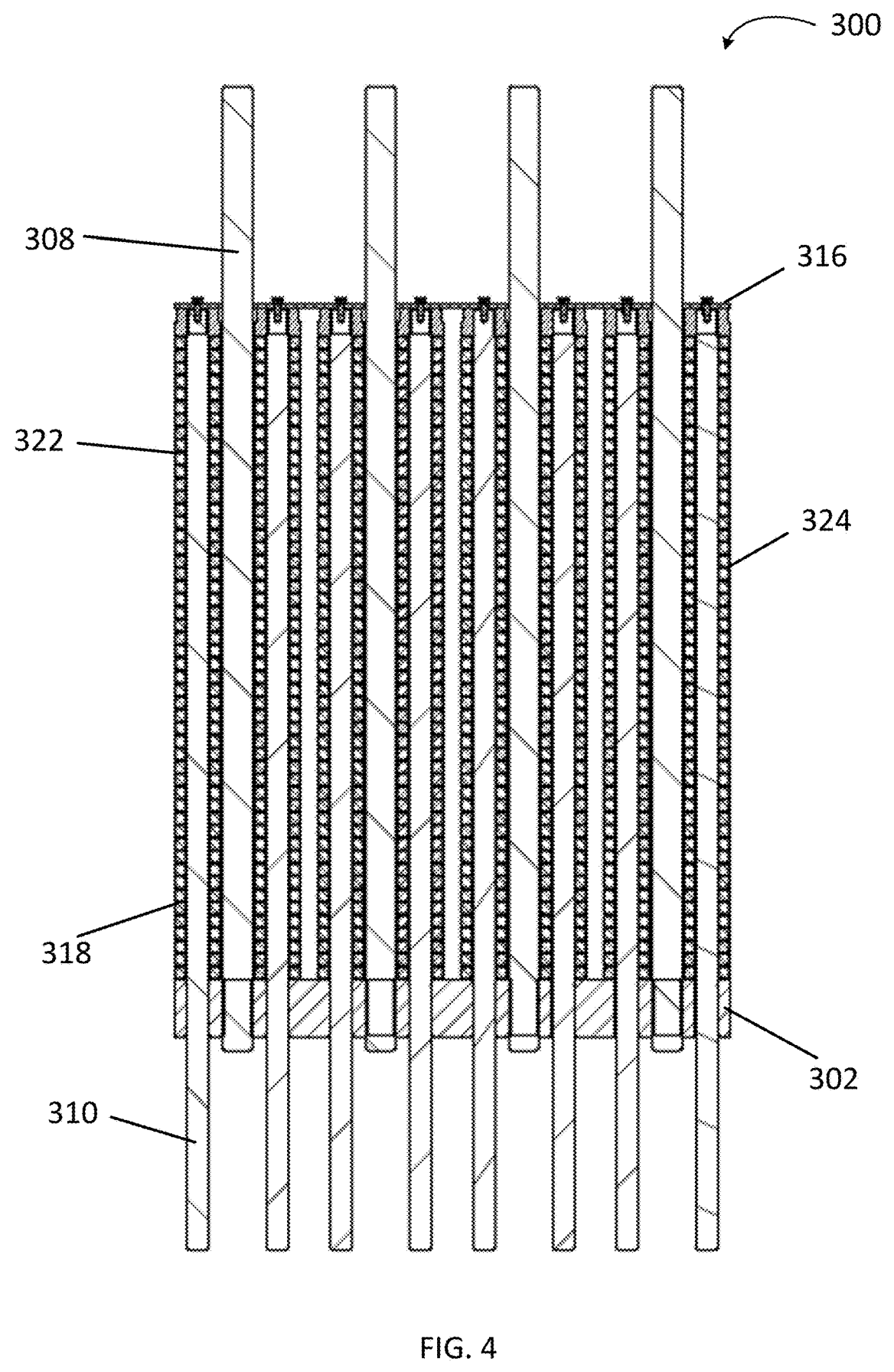

FIGS. 3 and 4 depict an example of a compression apparatus 300. FIG. 3 depicts a side view of such a compression apparatus 300 configured to be positioned on a side of an electrochemical stack (e.g., as depicted below in FIGS. 5-8), wherein the electrochemical stack includes a first plate, a second plate, and a plurality of electrochemical cells positioned between the first plate and the second plate. FIG. 4 depicts a cross-sectional view of the compression apparatus 300 of FIG. 3.

As shown in FIGS. 3 and 4, the compression apparatus 300 includes a spring compression bar 302 that is configured to be positioned between the first plate 304 and the second plate 306 of the electrochemical stack.

The compression apparatus 300 further includes a plurality of first fasteners 308. Each first fastener 308 is configured to be positioned through a respective opening of the first plate and a respective opening of the spring compression bar 302. Additionally, each first fastener 308 is secured at one end adjacent to the first plate 304 and at a second end adjacent to the spring compression bar 302.

The compression apparatus further includes a plurality of second fasteners 310. Each second fastener 310 is configured to be positioned through a respective opening of the spring compression bar 302 and a respective opening of the second plate 306. Additionally, each second fastener 310 is secured at one end adjacent to the first plate 304 and at a second end adjacent to the second plate 304. In certain examples, each second fastener is configured to be positioned through a respective opening of the first plate 302 to be secured adjacent to the first plate 302.

In certain examples, each fastener of the plurality of first fasteners 308 and the plurality of second fasteners 310 may individually include a machined stud or a bolt having a thread extending along at least a portion of a body of the machined stud or bolt. In certain examples, the bolt may be a carriage bolt, a hex bolt, a stove bolt, a machine bolt, or a combination thereof.

In certain examples, each first fastener 308 may be secured at the one end to the first plate 304 by a retaining component 312. The retaining component 312 may include a ring, a clip, a nut, a head of a bolt, or any combination thereof. In certain examples, the clip may be a c-clip. In certain examples, the nut may be a dome nut, a hex nut, a flange nut, or any combination thereof. In certain embodiments, the retaining component 312 may include a pneumatic nut, a hydraulic nut, or a pneumatic or hydraulic nut tensioner. This may advantageously allow a pneumatic or hydraulic system to be attached to the compression apparatus 300 to assist in providing active compression adjustments to the electrochemical stack, e.g., during operation of the stack.

The first fastener 308 may be configured to be secured adjacent (e.g., directly or indirectly) to the first plate 304. In some examples, the retaining component 312 is configured to abut an outer surface of the first plate 304 either directly or indirectly (e.g., via an intermediate washer).

Further, at the opposite, second end of each first fastener 308, the respective first fastener 308 may be secured to the spring compression bar 302 by an additional retaining component (not depicted) or the spring compression bar itself. The additional retaining component for the first fastener 308 may include a ring, a clip, a nut, a head of a bolt, or any combination thereof. In some examples, the retaining component and the additional retaining component for a respective first fastener 308 may be a same or different type of retaining component. The first fastener 308 may be configured to be secured adjacent (e.g., directly or indirectly) to the spring compression bar 302. In some examples, the additional retaining component is configured to abut an outer surface of the spring compression bar 302 directly or indirectly (e.g., via an intermediate washer).

In an alternative example, to the extent the second end of a first fastener 308 is secured by the spring compression bar 302 itself, this may include a threaded body of the first fastener 308 being screwed or threaded into a threaded opening within the spring compression bar 302 that is configured to receive and secure the threaded body of the first fastener 308 in a similar fashion as between a machined stud or bolt and a receiving nut.

Similarly to the first fasteners 308, in certain examples, each second fastener 310 may be secured at the one end adjacent to the first plate 304 by a retaining component (not depicted in FIG. 3). As described herein, the retaining component for the second fastener 310 may include a ring, a clip, a nut, a head of a bolt, or any combination thereof.

Further, at the opposite, second end of each second fastener 310, the respective second fastener 310 may be secured to the second plate 306 by an additional retaining component 314. The additional retaining component 314 for the second fastener 310 may include a ring, a clip, a nut, a head of a bolt, or any combination thereof. In some examples, the retaining component and the additional retaining component for a respective second fastener 310 may be a same or different type of retaining component. In certain embodiments, the additional retaining component 314 for the second fastener 310 may include a pneumatic nut, a hydraulic nut, or a pneumatic or hydraulic nut tensioner. This may advantageously allow a pneumatic or hydraulic system to be attached to the compression apparatus 300 to assist in providing active compression adjustments to the electrochemical stack, e.g., during operation of the stack.

In certain examples, such as depicted in FIGS. 3 and 4, the compression apparatus may further include an intermediary connector 316 configured to be positioned between the first plate 304 of the electrochemical stack and the spring compression bar 302. If present, each first fastener 308 is configured to be positioned through a respective opening of the first plate 304, a respective opening of the intermediary connector 316, and a respective opening of the spring compression bar 302.

Additionally, each second fastener 310 is configured to be positioned through a respective opening of the intermediary connector 316, a respective opening of the spring compression bar 302, and a respective opening of the second plate 306. Further, each second fastener 310 may be secured adjacent (e.g., directly or indirectly) to the intermediary connector 316, e.g., by a retaining component 318. In some examples, the retaining component 318 is configured to abut an outer surface of the intermediary connector 316 directly or indirectly (e.g., via an intermediate washer). In an alternative example, the second fastener 310 may be secured by the intermediary connector itself 316. This may include a threaded body of the second fastener 310 being screwed or threaded into a threaded opening within the intermediary connector 316 that is configured to receive and secure the threaded body of the second fastener 310 in a similar fashion as between a machined stud or bolt and a receiving nut.

As depicted in FIGS. 3 and 4, the compression apparatus 300 further includes a plurality of springs 318 positioned around a circumference of each second fastener 310 between the first plate 304 and second plate 306 of the electrochemical stack. In certain examples, such as depicted in FIGS. 3 and 4, the plurality of springs 318 for each second fastener 310 is configured to be positioned between the intermediary connector 316 and the spring compression bar 302 of the compression apparatus 300. In certain examples, the plurality of springs 318 may include disk springs, Belleville washers, conical springs, wave springs, die springs, or any combination thereof.

The springs 318 may be configured to function as a dampener to absorb changes in force acting on the electrochemical stack (e.g., caused by changes in operating conditions, such as changes in pressure and/or temperature within the stack) through compression or expansion. The presence of the plurality of springs 318 within the stack therein advantageously may avoid unnecessary forces acting on the end plates or outer components of the stack. Additionally, the plurality of springs advantageously provides a passive compression control for the stack that does not require any additional controller or active pressure monitoring system to absorb changes in the compression on the stack. Instead, the compression control on the stack is indirectly controlled by the design configurations of the plurality of springs 318 themselves, such as the material of the springs, length, or thickness of the springs, etc. Furthermore, utilizing springs as dampers to help accommodate the change in pressure due to thermally mismatched materials may advantageously improve seal or cell membrane life.

In certain examples, the compression apparatus may further include at least one compression relief cylinder 320, e.g., positioned between the second plate 304 and the spring compression bar 302. The compression relief cylinder 320 may be a hydraulic or pneumatic compression relief cylinder. The compression relief cylinder 320 may advantageously assist in decreasing the load on the plurality of electrochemical cells within the stack. This occurs because the compression relief cylinder 320 provides a parallel load path that shifts some of the load from the electrochemical cells to the compression relief cylinder 320 while the total load on the first and second fasteners 308, 310 of the compression apparatus 300 remains the same or approximately the same. During installation of the stack and compression apparatus 300, external cylinders may be used to preload the stack with a larger amount of load than required, and subsequently the compression relief cylinder 320 of the compression apparatus 300 may be used to decrease the load on the electrochemical cells of the stack to a predefined/optimal load amount.

In certain examples, a compression relief cylinder 320 is positioned in an open space between the spring compression bar 302 and the second plate 304 below an end of a first fastener 308. In certain examples, a compression relief cylinder 320 is positioned in each open space below an end of each respective first fastener 308.

The compression relief cylinder 320 may be secured to an end of the respective first fastener and/or to either or both the spring compression bar and/or the second plate via at least one retaining component as described herein. For simplicity, FIG. 3 only depicts one compression relief cylinder 320 and no retaining components, yet more than one compression relief cylinder with one or more retaining components is possible.

In the compression apparatus 300, with the positioning of the springs 318 on each second fastener 310, upon securing the first fasteners 308 to the first plate 304 and spring compression bar 302, and upon securing the second fasteners 310 to the second plate 306 and either the first plate 304 or intermediary connector 316, a tension force is applied to the first fastener 308 and the second fastener 310, which is converted into a compression force along the springs 318. The total height of the springs 318 is shorter than the length of the fasteners. Furthermore, as noted above, this configuration and arrangement of springs 318 within the compression apparatus 300 advantageously uses unutilized space around the perimeter of the electrochemical cells of the electrochemical stack, while also avoiding adding additional height to the electrochemical stack that would exist if an array or bed of springs were positioned on at least one end of the stack between the outer plates of the stack.

Regarding the arrangement and positioning of first and second fasteners 308, 310 within the compression apparatus 300, any arrangement of first and second fasteners 308, 310 is possible that is configured to provide uniform compression for the electrochemical stack.

In one example, each first fastener 308 has at least one second fastener 310 positioned directly adjacent on each side of the first fastener 308 in a linear arrangement configured to be positioned along and parallel with an outer edge of the electrochemical stack. When the tension force is applied to the fasteners 308, 310, the compression force on the springs 318 is divided between the at least two (e.g., two) surrounding second fasteners 310 with springs 318 around the circumference of each second fastener 310. By dividing the force amongst the at least two (e.g., two) second fasteners 310 with springs 316, the diameter of the springs 318 can be smaller than if only one spring stack was used. The diameter of the springs 318 and linear arrangement is optimized to allow the compression apparatus 300 to sit as close to the electrochemical stack as feasible. The smaller the spring circumference, the smaller the overall footprint of the stack will be. Additionally, if larger springs are used, the compression apparatus 300 will not be as close to the electrochemical stack, and thus diminish the dampening effect on the system.

In another example, at least one second fastener 310 of the plurality of second fasteners may be positioned adjacent to a first end 322 of the compression apparatus and at least one second fastener 310 of the plurality of second fasteners may be positioned adjacent to a second end 324 of the compression apparatus such that each first fastener 308 of the plurality of first fasteners is positioned between the second fasteners 310 positioned at the first and second ends 322, 324 of the compression apparatus 300. In other words, the plurality of first fasteners and the plurality of second fasteners including the springs are configured in a linear arrangement. The number of second fasteners 310 present in between each adjacent first fasteners 308 may vary depending on size constraints of the electrochemical system.

In another example, one second fastener 310 is present between each adjacent first fasteners 308. In another example, two second fasteners 310 are present between each adjacent first fasteners 308. In another example, three or more second fasteners 310 are present between each adjacent first fasteners 308. The amount of second fasteners 310 present between each first fastener 308 can be optimized based on the size of the compression apparatus 300, the size of the spring diameters, and the overall system requirements.

The compression apparatus 300 may be configured to absorb changes in force (caused by changes in operating conditions such as pressure and/or temperature of the electrochemical stack). The plurality of springs 318 is configured to convey or transfer uniform compression across the spring compression bar 302 (and, in certain examples, the intermediary connector 316), which conforms to the stack components. The plurality of springs 318 may be configured to absorb various force or compression changes during changes in operating conditions of the stack (e.g., changes in pressure and/or temperature within the stack). For example, as the stack experiences different changes in temperature during different operating conditions of the stack, the stack will either expand or contract. The plurality of springs 318 may be configured to adjust or accommodate for the temperature/pressure changes and keeping the stack under a desired compression. The arrangement of first fasteners 308, second fasteners 310, and springs 318 may advantageously be implemented to reach a desired compression state.

Electrochemical Stack

As described above with FIG. 2, an electrochemical stack includes a plurality of electrochemical cells. The electrochemical cells may form a stack having a rectangular perimeter having two long edges and two short edges.

Each compression apparatus, as described above, is configured to be placed along an outer edge of the electrochemical stack. As noted above, by placing the compression apparatus along an edge of the electrochemical stack, unutilized space of the system can be used, therein avoiding including an array of springs as a layer to the stack and therefore adding additional height to the electrochemical stack. By decreasing the overall footprint of the stack, more vertical space may be made available to add more electrochemical cells, substacks of cells, or stacks.

Figure 5:
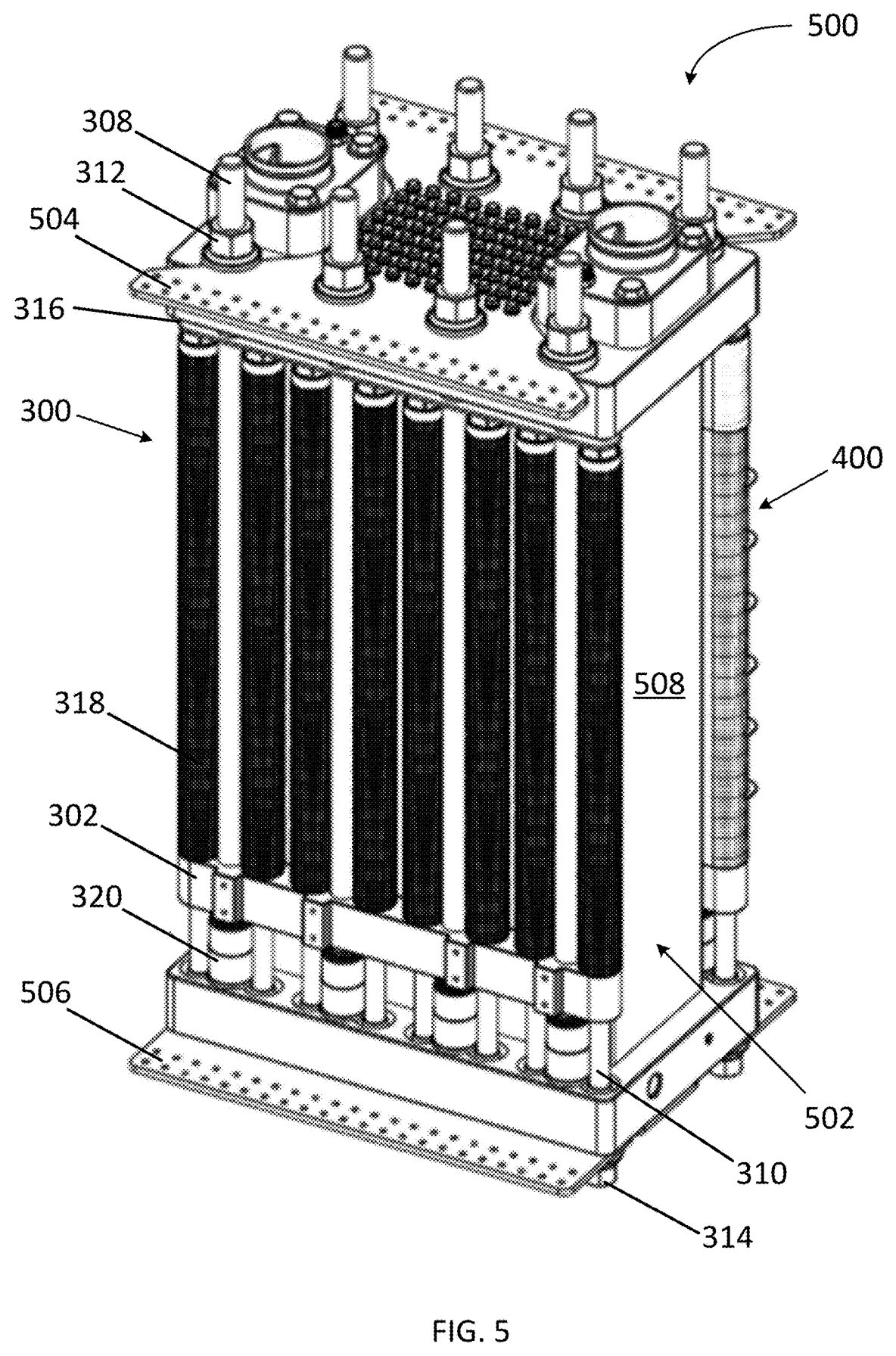
Figure 6:
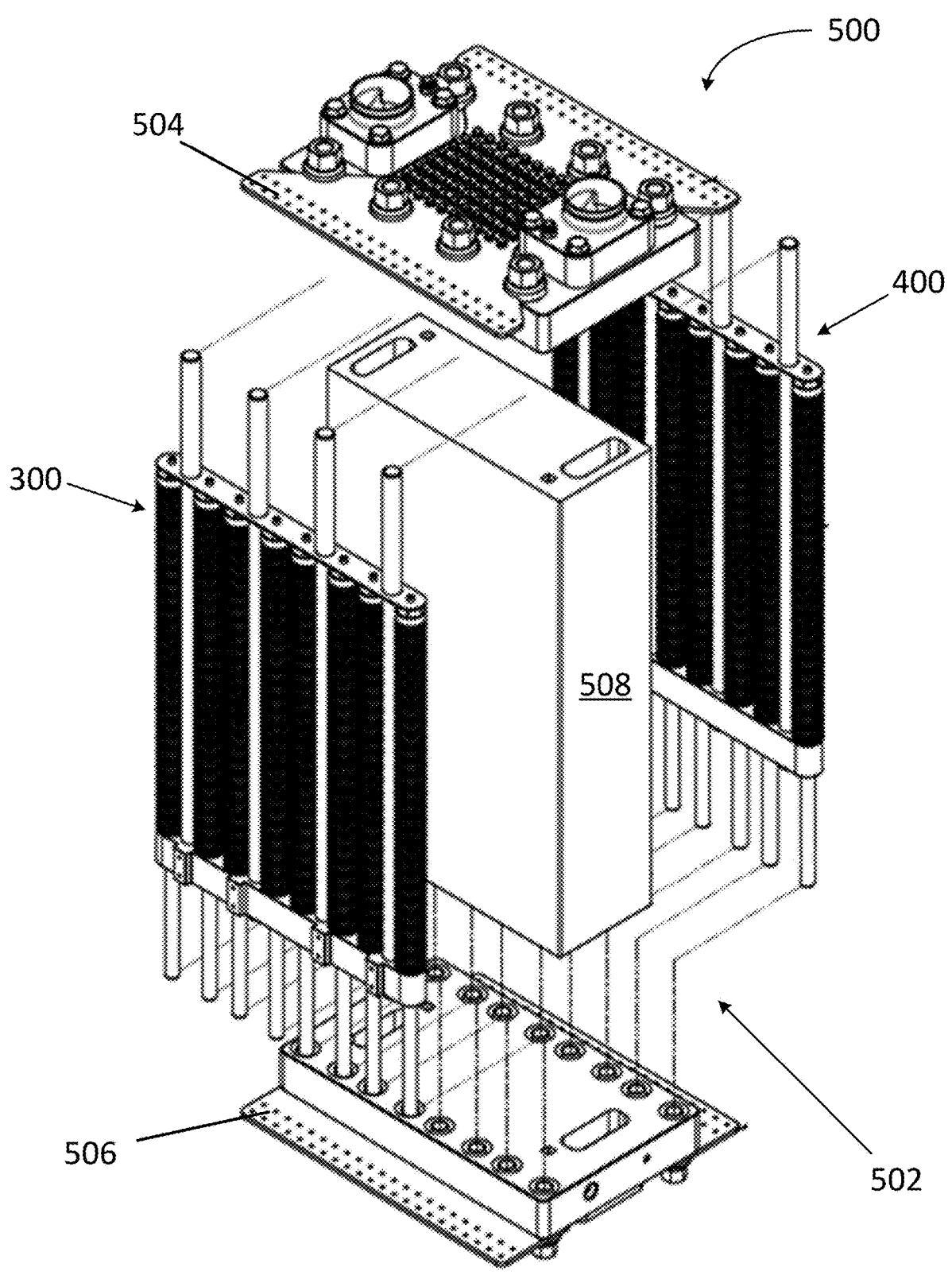
FIG. 6 depicts an exploded view of the electrochemical stack in FIG. 5.
Figure 7:
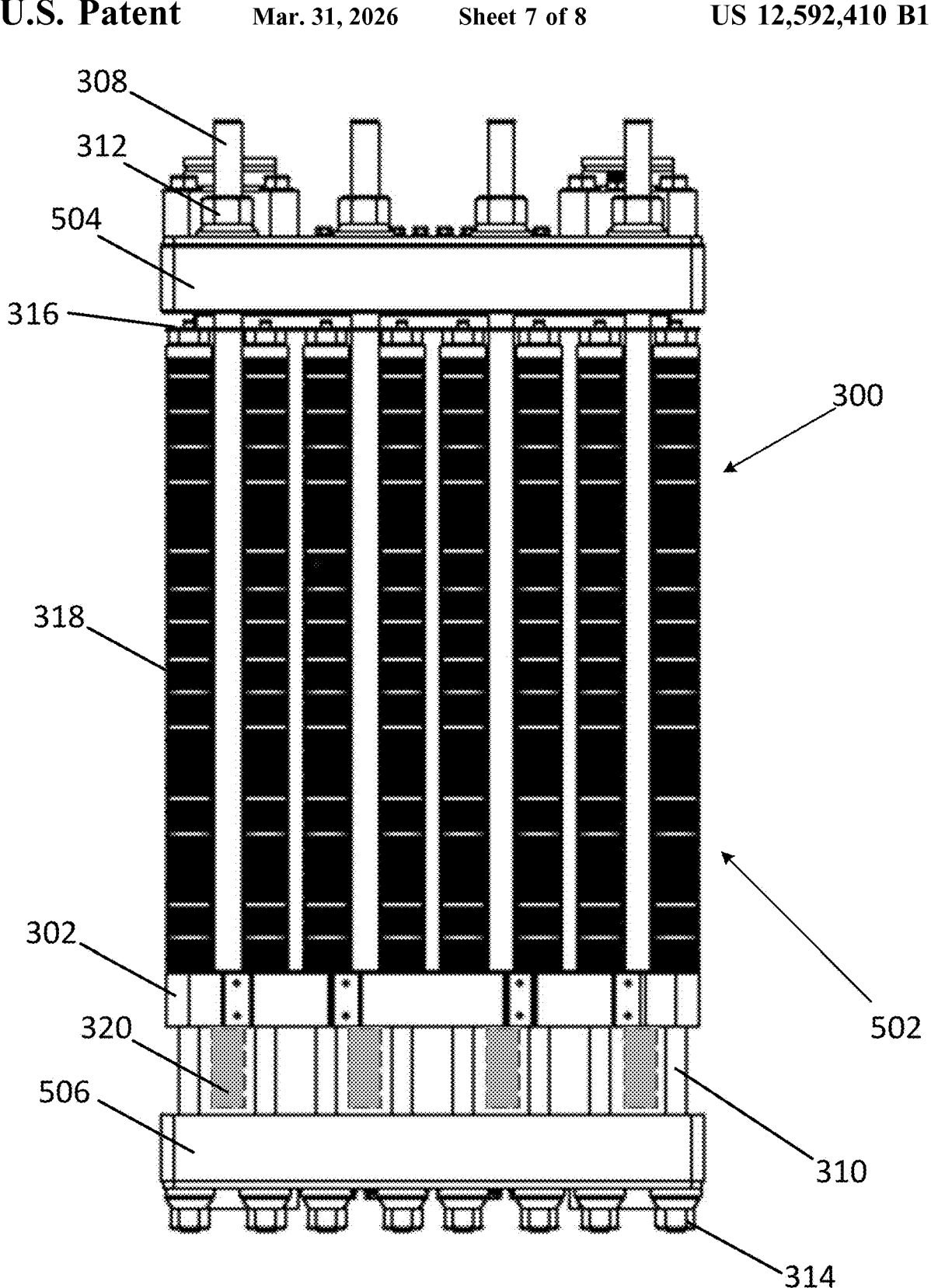
FIG. 7 depicts an example of a side view of a long side of an electrochemical stack having a compression apparatus.
Figure 8:
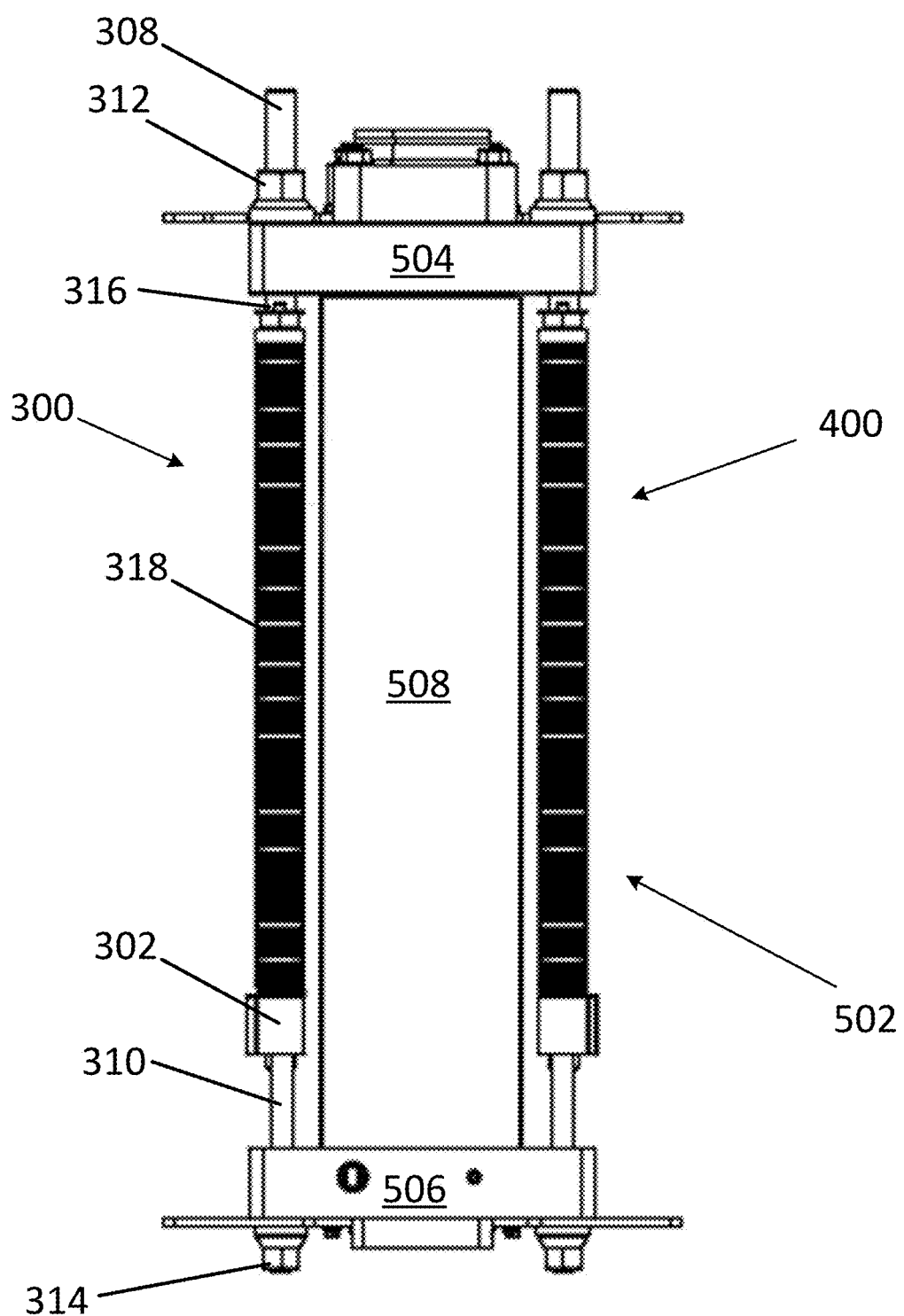
FIG. 8 depicts a side view of a short side of the electrochemical stack having the compression apparatus in FIG. 7.

FIGS. 5-8 depict examples of a system 500 having compression apparatuses 300, 400 attached to an electrochemical stack 502. Specifically, FIG. 5 depicts an example of an electrochemical stack 502 with a first compression apparatus 300 positioned on one edge of the electrochemical stack 502 and a second compression apparatus 400 positioned on a second, opposite edge of the electrochemical stack 502. FIG. 6 depicts an exploded view of the system 500 in FIG. 5. Additionally, FIG. 7 depicts a side view along a long edge the electrochemical stack 502 depicting one of the compression apparatuses 300 from FIGS. 5 and 6. Further, FIG. 8 depicts a second side view along a short edge of the electrochemical stack 502 having the compression apparatuses 300, 400 in from FIGS. 5 and 6.

In the example depicted in FIGS. 5-8, the electrochemical stack 502 includes a first plate 504, a second plate 506, and a plurality of electrochemical cells 508 positioned between the first and second plates 504, 506. Additionally, the stack 502 further includes a first compression apparatus 300 and a second compression apparatus 400, as described above.

For example, the first and/or second compression apparatuses 300, 400 may include a spring compression bar 302, a plurality of first fasteners 308, a plurality of second fasteners 310 having a plurality of springs 318 positioned around a circumference of each respective second fastener 310. The compression apparatuses 300, 400 may additionally include an intermediary connector 316. Further, each compression apparatus may include a plurality of retaining components 312, 314, 318 as described above. Additionally, in certain examples, the compression apparatus may include at least one compression relief cylinder 320 as described above.

As depicted in the figures, the first compression apparatus 300 is positioned on a first edge of the plurality of electrochemical cells 508 and the second compression apparatus 400 is positioned on a second edge of the plurality of electrochemical cells 508 opposite from the first edge. By including two compression apparatuses 300, 400 on the electrochemical stack 502 on opposite sides or edges, even compression throughout the system may advantageously be achieved.

As depicted in FIGS. 5-8, the first and second compression apparatuses 300, 400 are positioned on the first and second long edges of the stack 502. Alternatively, while not depicted, the first and second compression apparatuses may be positioned on the first and second short edges of the stack. This may require a reconfiguration of the sizing and positioning of the plurality of springs around the second fasteners of the compression apparatuses to achieve similar compression control in comparison to a system having first and second compression apparatuses along the long edges.

In a further alternative example, while not depicted, the electrochemical stack may further include a third compression apparatus and a fourth compression apparatus positioned around the perimeter of the cells of the stack. For example, the first compression apparatus and the second compression apparatus may be positioned on the first and second long edges of the electrochemical stack and the third compression apparatus and the fourth compression apparatus may be positioned on the first and second short edges of the electrochemical stack, or vice versa. The addition of the third and fourth compression apparatus may require a reconfiguration of the sizing and positioning of the plurality of springs around the second fasteners of the compression apparatuses to achieve similar compression control in comparison to a system having only first and second compression apparatuses along the long or short edges.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the disclosure. The claims should not be read as limited to the described order or elements unless stated to that effect. Therefore, all embodiments that come within the scope and spirit of the following claims and equivalents thereto are claimed as the disclosure.

The invention claimed is:

1. A compression apparatus for an electrochemical stack having a first plate extending along a first plane, a second plate extending along a second plane parallel to the first plane, and plurality of electrochemical cells positioned between the first plate and the second plate, wherein the plurality of electrochemical cells comprises four sides, each side extending along a respective plane between the first plate and the second plate of the electrochemical stack orthogonal to the first plane of the first plate and the second plane of the second plate, and wherein the four sides of the plurality of electrochemical cells are respective faces forming a border of the plurality of electrochemical cells, the compression apparatus comprising:

a spring compression bar positioned between the first plate and the second plate of the electrochemical stack;

a plurality of first fasteners, wherein each first fastener is configured to be positioned through a respective opening of the first plate and a respective opening of the spring compression bar, and wherein each first fastener is secured at one end adjacent to the first plate and at a second end adjacent to the spring compression bar; and a plurality of second fasteners, wherein each second fastener is configured to be positioned through a respective opening of the spring compression bar and a respective opening of the second plate, wherein each second fastener is secured at one end adjacent to the first plate and at a second end adjacent to the second plate; and a plurality of springs positioned around a circumference of each second fastener between the first plate and the spring compression bar of the respective second fastener, wherein the compression apparatus is configured to be positioned along one face of the border of the plurality of electrochemical cells, and wherein the spring compression bar is configured to be positioned at an intermediate location between a top and a bottom of the plurality of electrochemical cells along the one face of the border of the plurality of electrochemical cells.

2. The compression apparatus of claim 1, further comprising:

an intermediary connector positioned between the first plate and the spring compression bar of the electrochemical stack, wherein each second fastener is further configured to be positioned through a respective opening of the intermediary connector, and wherein the plurality of springs is positioned around the circumference of each second fastener between the intermediary connector and the spring compression bar of the respective second fastener.

3. The compression apparatus of claim 1, wherein at least one second fastener of the plurality of second fasteners is positioned adjacent to a first end of the compression apparatus and at least one second fastener of the plurality of second fasteners is positioned adjacent to a second end of the compression apparatus such that each first fastener of the plurality of first fasteners is positioned between the second fasteners positioned at the first and second ends of the compression apparatus.

4. The compression apparatus of claim 3, wherein at least one second fastener of the plurality of second fasteners is positioned between each first fastener of the plurality of first fasteners.

5. The compression apparatus of claim 1, wherein the plurality of springs comprises disk springs, Belleville washers, conical springs, coil springs, wave springs, die springs, or any combination thereof.

6. The compression apparatus of claim 1, wherein the plurality of first fasteners and the plurality of second fasteners individually comprise a machined stud or a bolt having a thread extending along at least a portion of a body of the machined stud or bolt.

7. The compression apparatus of claim 1, wherein each first fastener is secured at the one end adjacent to the first plate by a retaining component and at the second end adjacent to the spring compression bar by an additional retaining component or the spring compression bar itself, wherein each second fastener is secured at the one end adjacent to the first plate by a retaining component or an intermediary connector and at the second end adjacent to the second plate by an additional retaining component, and wherein the retaining component and the additional retaining component for the plurality of first fasteners and the plurality of second fasteners individually comprise a ring, a clip, a nut, or a head of a bolt.

8. The compression apparatus of claim 1, wherein the compression apparatus is configured to absorb a change in force caused by a change in an operating condition of the electrochemical stack, and wherein the change in the operating condition is a change in an operating pressure and/or operating temperature of the electrochemical stack.

9. The compression apparatus of claim 1, further comprising:

at least one compression relief cylinder positioned between the spring compression bar and the second plate of the electrochemical stack, wherein the at least one compression relief cylinder is configured to reduce a load on the plurality of electrochemical cells of the electrochemical stack.

10. An electrochemical stack comprising:

a first plate extending along a first plane;

a second plate extending along a second plane parallel to the first plane;

a plurality of electrochemical cells positioned between the first plate and the second plate, wherein the plurality of electrochemical cells comprises four sides, each side extending along a respective plane between the first plate and the second plate orthogonal to the first plane of the first plate and the second plane of the second plate, and wherein the four sides of the plurality of electrochemical cells are respective faces forming a border of the plurality of electrochemical cells;

a first compression apparatus positioned along a first face of the border of the plurality of electrochemical cells; and a second compression apparatus positioned along a second face of the border of the plurality of electrochemical cells opposite from the first face, wherein each compression apparatus of the first compression apparatus and the second compression apparatus comprises:

a spring compression bar positioned between the first plate and the second plate of the electrochemical stack at an intermediate location between a top and a bottom of the plurality of electrochemical cells along the respective face of the border of the plurality of electrochemical cells;

a plurality of first fasteners, wherein each first fastener is configured to be positioned through a respective opening of the first plate and a respective opening of the spring compression bar, and wherein each first fastener is secured at one end adjacent to the first plate and at a second end adjacent to the spring compression bar; and a plurality of second fasteners, wherein each second fastener is configured to be positioned through a respective opening of the spring compression bar and a respective opening of the second plate, wherein each second fastener is secured at one end adjacent to the first plate and at a second end adjacent to the second plate; and a plurality of springs positioned around a circumference of each second fastener between the first plate and the spring compression bar of the respective second fastener.

11. The compression apparatus of claim 10, wherein each compression apparatus further comprises:

an intermediary connector positioned between the first plate and the spring compression bar of the electrochemical stack, wherein each second fastener is further configured to be positioned through a respective opening of the intermediary connector, and wherein the plurality of springs is positioned around the circumference of each second fastener between the intermediary connector and the spring compression bar of the respective second fastener.

12. The electrochemical stack of claim 10, wherein the electrochemical stack has a rectangular shape having a first and second long edges and first and second short edges, and wherein the first compression apparatus and the second compression apparatus are positioned on the first and second long edges of the electrochemical stack or the first and second short edges of the electrochemical stack.

13. The electrochemical stack of claim 10, further comprising:

a third compression apparatus and a fourth compression apparatus, wherein each compression apparatus of the third compression apparatus and the fourth compression apparatus comprises:

a spring compression bar positioned between the first plate and the second plate of the electrochemical stack at an intermediate location between the top and the bottom of the plurality of electrochemical cells along the respective face of the border of the plurality of electrochemical cells;

a plurality of first fasteners, wherein each first fastener is configured to be positioned through a respective opening of the first plate and a respective opening of the spring compression bar, and wherein each first fastener is secured at one end adjacent to the first plate and at a second end adjacent to the spring compression bar; and a plurality of second fasteners, wherein each second fastener is configured to be positioned through a respective opening of the spring compression bar and a respective opening of the second plate, wherein each second fastener is secured at one end adjacent to the first plate and at a second end adjacent to the second plate; and a plurality of springs positioned around a circumference of each second fastener between the first plate and the spring compression bar of the respective second fastener, wherein the electrochemical stack has a rectangular shape having a first and second long edges and first and second short edges, wherein the first compression apparatus and the second compression apparatus are positioned on the first and second long edges of the electrochemical stack, and wherein the third compression apparatus and the fourth compression apparatus are each positioned on the first and second short edges of the electrochemical stack.

14. The electrochemical stack of claim 10, wherein at least one second fastener of the plurality of second fasteners is positioned adjacent to a first end of the compression apparatus and at least one second fastener of the plurality of second fasteners is positioned adjacent to a second end of the compression apparatus such that each first fastener of the plurality of first fasteners is positioned between the second fasteners positioned at the first and second ends of the compression apparatus.

15. The electrochemical stack of claim 14, wherein at least one second fastener of the plurality of second fasteners is positioned between each first fastener of the plurality of first fasteners.

16. The electrochemical stack of claim 10, wherein the plurality of springs comprises disk springs, Belleville washers, conical springs, coil springs, wave springs, die springs, or any combination thereof.

17. The electrochemical stack of claim 10, wherein the plurality of first fasteners and the plurality of second fasteners individually comprise a machined stud or a bolt having a thread extending along at least a portion of a body of the machined stud or bolt.

18. The electrochemical stack of claim 10, wherein each first fastener is secured at the one end adjacent to the first plate by a retaining component and at the second end adjacent to the spring compression bar by an additional retaining component or the spring compression bar itself, wherein each second fastener is secured at the one end adjacent to the first plate by a retaining component or an intermediary connector and at the second end adjacent to the second plate by an additional retaining component, and wherein the retaining component and the additional retaining component for the plurality of first fasteners and the plurality of second fasteners individually comprise a ring, a clip, a nut, or a head of a bolt.

19. The electrochemical stack of claim 10, wherein each compression apparatus is configured to absorb a change in force caused by a change in an operating condition of the electrochemical stack, and wherein the change in the operating condition is a change in an operating pressure and/or operating temperature of the electrochemical stack.

20. The electrochemical stack of claim 10, wherein each compression apparatus further comprises:

at least one compression relief cylinder positioned between the spring compression bar and the second plate of the electrochemical stack, wherein the at least one compression relief cylinder is configured to reduce a load on the plurality of electrochemical cells of the electrochemical stack.

* * * * *